June 14, 1960 E. W. CURTIS 2,940,776
TRAILER COUPLING MECHANISM
Filed Dec. 22, 1958 2 Sheets-Sheet 1
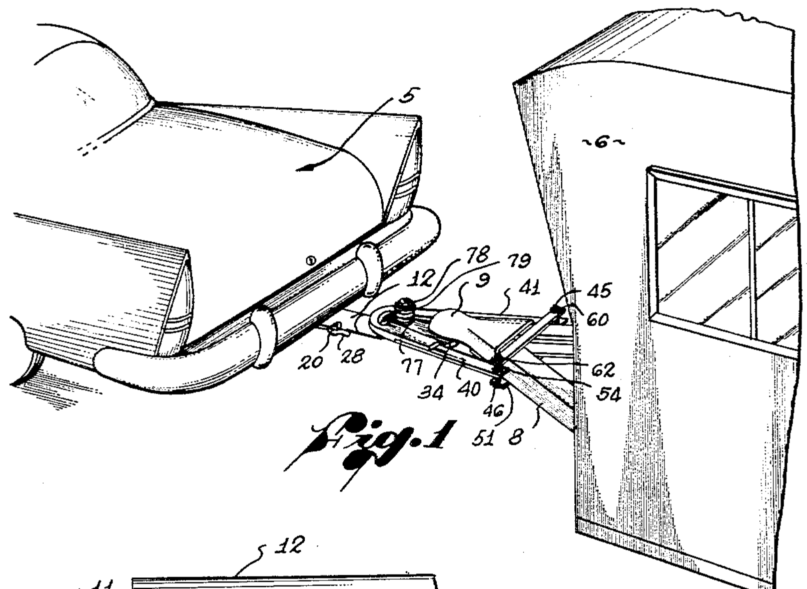
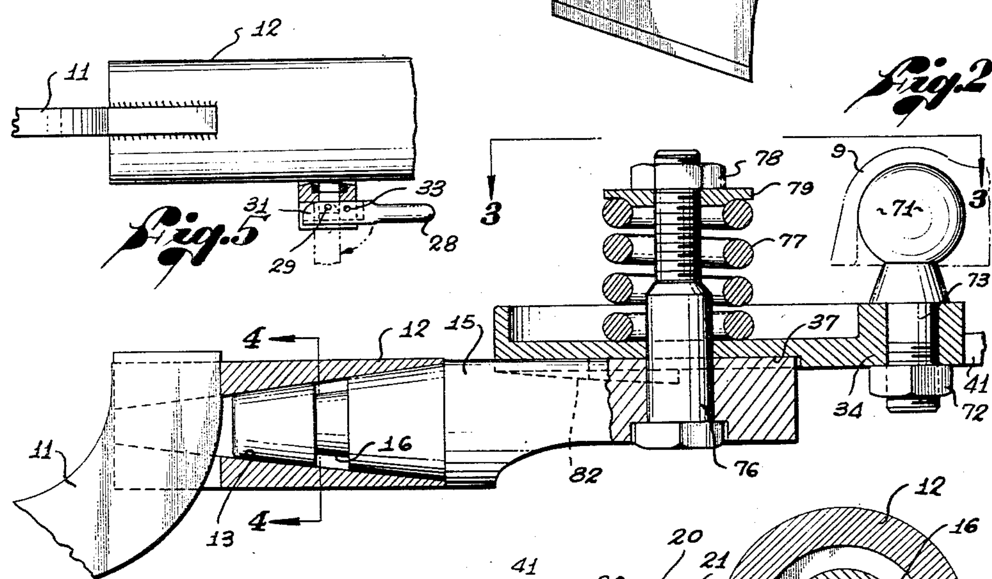
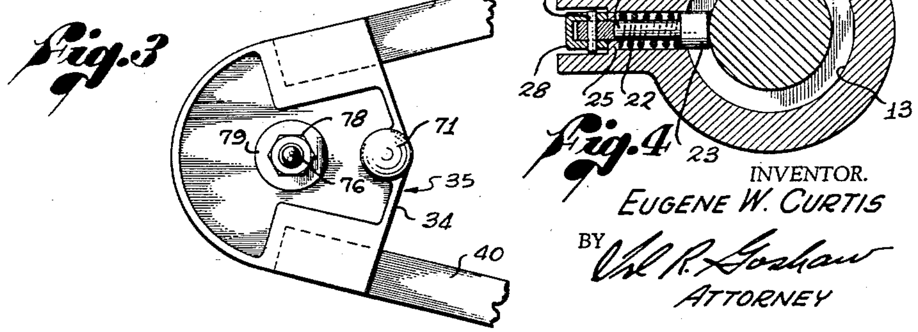
INVENTOR.
EUGENE W. CURTIS
BY Val R. Gosham
ATTORNEY June 14, 1960 E. W. CURTIS 2,940,776
TRAILER COUPLING MECHANISM
Filed Dec. 22, 1958 2 Sheets-Sheet 2
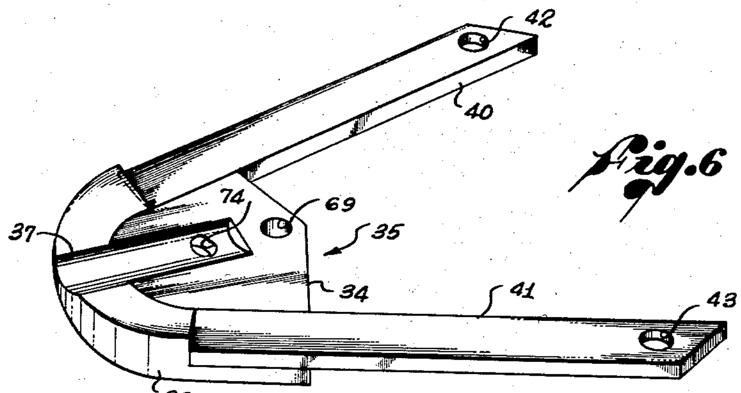
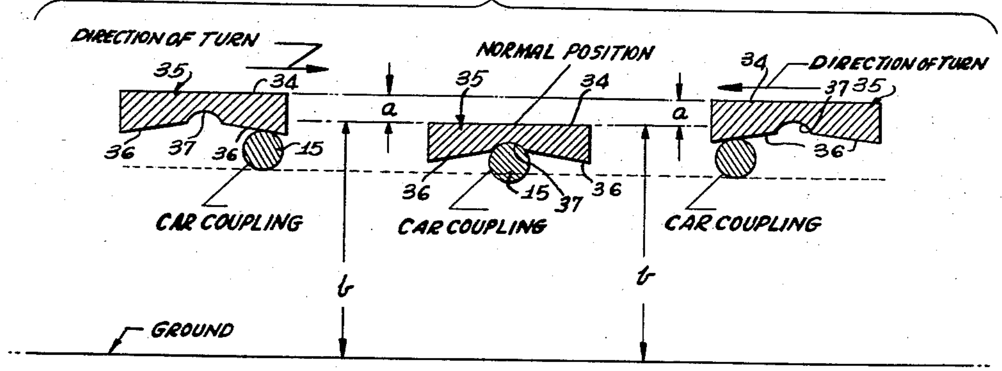
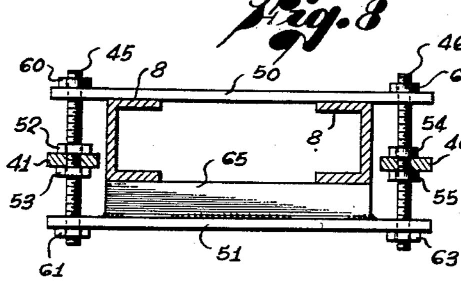
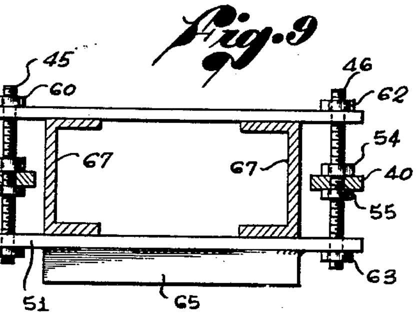
INVENTOR.
EUGENE W. CURTIS
BY
ATTORNEY United States Patent Office 2,940,776
Patented June 14, 1960

2,940,776

TRAILER COUPLING MECHANISM

Eugene W. Curtis, 127 W. Merrill Ave., Rialto, Calif.

Filed Dec. 22, 1958, Ser. No. 782,260
14 Claims. (Cl. 280—446)

This invention relates to coupling devices, and particularly to load equalizing and draft stabilizing couplers between a towing vehicle and a vehicle being towed thereby, such as mobile homes, boat trailers, and the like.

Coupling devices between automobiles and towed trailers must lift the load imposed on the rear of the car by the trailer weight and distribute this weight to the wheels of both the automobile and the trailer to provide proper traction to all wheels. These coupling devices, also known as trailer hitches, should also permit rapid attachment and detachment between the automobile and trailer while also providing the required safety.

One of the important features of the present invention is that it creates a vertical lift or support to the load when turning the automobile and trailer instead of dropping the load on the rear of the car, as do many other couplers. This reduces the strains and twists placed on the frames and bodies of the car and trailer. Also, jackknifing of the car and trailer is prevented.

The invention also eliminates a bobbing or undulating motion of the vehicles by the use of a horizontal plate from which a spring-loaded pivotal connection restricts the rebound of the load after it passes the level position in the same manner that it supports the sagging load below the level position. This particular coupling will permit one vehicle to stay upright in the event the other vehicle is turned over.

Other features of the coupling mechanism will be realized from the description hereinafter.

The principal object of the invention, therefore, is to facilitate the coupling of a towing vehicle with a vehicle to be towed thereby.

Another object of the invention is to provide an improved coupling device, such as a trailer hitch, between automobiles and towed vehicles, such as mobile homes, boat trailers, horse trailers, and the like.

A further object of the invention is to provide an improved trailer hitch which provides maximum safety, an automatic steering control, reduces bobbing and undulating motion of the vehicles, provides a vertical lift or support to the load when turning, and maintains the towing vehicle and towed vehicle in a true line during straight travel.

A better understanding of this invention may be had from the following detailed description when read in connection with the accompanying drawings, in which:

Fig. 1 is a perspective view showing the invention connecting a partially shown automobile with a partially shown mobile house trailer;

Fig. 2 is an elevational view, partly in cross section, showing a portion of the mechanism embodied in the invention;

Fig. 3 is a plan view of the horizontal plate and spring bar connector embodied in the invention and taken along the line 3—3 of Fig. 2;

Fig. 4 is a cross-sectional view taken along the line 4—4 of Fig. 3;

Fig. 5 is a detail view showing the locking mechanism between the automobile and trailer;

Fig. 6 is a perspective bottom view of the horizontal plate and spring bar connector;

Fig. 7 is a diagrammatic view showing the lifting action of the invention during turning of the vehicles coupled by the invention;

Fig. 8 is an elevational view showing the spring bar connection of the A frame of a trailer when the A frame has one dimension; and Fig. 9 is an elevational view showing the spring bar connection to the A frame of a trailer when the A frame has another dimension.

Referring now to the drawings in which the same reference numerals indicate the same elements, an automobile 5 is shown coupled to a trailer 6 by the invention, the trailer 6 having the usual A frame 8 with a ball socket 9. Extending rearwardly from the automobile and attached thereto in any suitable manner is an upwardly curved flat strip 11 which is welded to a cylinder 12 which has an interior tapered opening as shown at 13. Other forms of rigid car attachments may also be used but they should terminate in the cylinder 12. The tapered opening 13 of the cylinder 12 is adapted to accommodate a pintle drawbar 15 having a similar external taper between the ends thereof and which has an annular notch or groove therein to provide a smaller diameter portion 16. A pintle or coupling rod of this type is shown in Patent No. 2,133,065 of October 11, 1938.

The cylinder 12 has a side boss 20 through which and through the wall of cylinder 12 extends a rod 21 surrounded by a compression spring 22 and terminating in a grooved block 23 to fit against portion 16 when in locking position. One end of the spring 22 abuts block 23 and the other end of the spring 22 abuts a shoulder 25 within the boss 20 and through which the rod 21 passes so that the block 23 is always urged toward the section 16. To remove the block 23 from the section 16 to release the trailer from the automobile, a handle 28 is provided, the handle being pivoted on a pin 29. By rotating the handle 28 from its full line position shown in Fig. 5 to its dotted line position shown in Fig. 5, the handle 28 will remove the block 23 from the section 16 and release the pintle 15 from the cylinder 12. To lock the block 23 in connected position, a pin 33 may be inserted through a hole in the handle and a hole in the boss 20. This provides a fast method of coupling and uncoupling the towing and towed vehicles.

Another component of the coupler between the cylinder 12 and the A frame 8 is shown generally at 35 (see Fig. 6), and consists of a V-shaped horizontal plate 34 with an arcuate front cam portion 36 and a groove 37 therein on the underside of the plate. The diverging two legs 40 and 41 of the unit 35 are spring bars and are attached in any suitable manner to the plate 34, such as by welding or bolting, the ends of the bars having respective holes 42 and 43 therein through which pass respective bolts 45 and 46 (see Figs. 8 and 9). The bolts 45 and 46 connect an upper plate 50 resting on the top of A frame 8 to a lower plate 51 under A frame 8, the ends of the spring bars being held in proper spaced position by nuts 52, 53, 54, and 55 on the bolts 45 and 46, while the ends of the bolts 45 and 46 are fastened to the plates 50 and 51 by respective nuts 60, 61, 62, and 63.

It will be noted that the plate 51, as shown in Fig. 8, has a flange or web 65 which is above plate 51 and which abuts the lower surface of the A frame 8. Should the coupler be attached to an A frame having greater height, such as shown at 67, the flange 65 of the plate 51 may be reversed to accommodate the change in size.

Thus, the provision of the flange or web 65 on the lower plate 51 permits the coupler to be readily attached to A frames of different heights.

Referring now to the remaining portion of the coupling device, the opening 69 of the unit 35 serves to fasten a coupling ball 71 to the plate 34 by its shaft 73 and nut 72. The socket 9 fits on the ball. In the opening 74 of the unit 35 is a bolt 76 passing through the end 85 of pintle 15 and which has its head positioned within a recess in the pintle to prevent the rotation thereof. The bolt 76 is surrounded by a coil compression spring 77 held in position by a nut 78 bearing on a washer 79.

As shown by the dotted line 82 in Fig. 2 and by the sloping lines in Fig. 7, the plate 34 increases in thickness toward its sides to provide a double tapered cam. However, during straightaway travel, the end of pintle 15 rests in the recess 37 of the unit 35. (See Fig. 7.) The positioning of the end of the pintle drawbar 15 in the recess 37, and holding it therein by the tension of spring 77, provides true line straightaway travel and eliminates the usual swaying when passing a bus or large truck. Now when the automobile 5 turns in either direction, the plate rotates on bolt 76, and the plate 34 will be raised with respect to the pintle, which increases the tension in spring 77 and increases the rigidity of the coupling during the turning operation. Since the plate 34 is fixed with respect to the frame 8 and pintle 15 is fixed with respect to the frame of car 5, the rear end of the car is also raised to prevent surging between the car and trailer on turns. Since the pintle is rigid, its free end follows the height position of the portion on the cam 36. This lifting action is shown by the distance *a* and the distance *b* as shown in Fig. 7. For the purposes of illustration, the pintle is shown as a circle, it being understood that its axis is at an angle to the axis of recess 37. This lifting action and increased tension actually aids in steering the towed vehicle during turning by preventing free tail movement of the car. There is thus no rocking or rolling transmitted to the car and a certain "load free" feeling is obtained. Also, during turning, the hitch load is actually picked up instead of dropping it on the rear of the towing car. This saves tire wear.

The use of the spring bars 40 and 41 provides some resiliency between the car and trailer to decrease the effects of excessive surges over rough roads.

It will be noted that the hitch may be rapidly disconnected from the automobile by simply removing the pin 33 and rotating the handle 28 to the dotted line position shown in Fig. 5, and the connection is as quickly accomplished by inserting the pintle 15 into the cylinder 12 and turning the handle to the full line position shown in Fig. 5. The coupler locks out the usual uncontrolled action of the usual ball and socket hitch. The invention, therefore, provides an improved coupling device between a towing vehicle and a towed vehicle to provide more safety with better handling, particularly steering during turning.

I claim:

1. A coupling device between towing and towed vehicles comprising an interiorly tapered cylindrical member attached to said towing vehicle, a tapered pintle adapted to be inserted in said member, means for locking said pintle to said member, a frame on said towed vehicle having a socket therein, a horizontal plate having a partial cylindrical groove therein in which one end of said pintle is accommodated when said vehicles are in a straightaway direction of travel, tapered surfaces extending from each side of said groove, a ball attached to said plate and adapted to be connected to said socket, and a pivot bolt passing through said plate and said pintle on which said pintle is rotatable, and resilient means for holding said plate to said pintle.

2. A coupling device in accordance with claim 1 in which said resilient means is a coil spring surrounding said pivot bolt to permit said pintle to move along one of said tapered surfaces depending upon the direction said vehicles are turning, the tension in said spring being increased as said vehicles turn.

3. A coupling device in accordance with claim 1 in which are provided flat spring bars having one pair of ends connected to said plate and their other pair of ends connected to said frame.

4. A coupling device between a towing vehicle and a towed vehicle comprising an element fixedly connected to said towing vehicle, a plate fixedly connected to said towed vehicle, said plate having a partially cylindrical groove therein in which said cylindrical element is positioned during straightaway travel of said vehicles, said plate also having arcuate front cam portions extending from said groove, means for rotatably connecting said plate to said element, a ball on said plate, and a socket on said towed vehicle attached to said ball.

5. A coupling device in accordance with claim 4 in which a frame is provided for said towed vehicle, said socket being connected to said frame.

6. A coupling device in accordance with claim 5 in which spring bars connect said plate to said frame.

7. A coupling device in accordance with claim 6 in which adjustable means are provided for connecting said bars to said frame.

8. A coupling device between a towing vehicle and a towed vehicle comprising a cylindrical element adapted to be fixedly attached to said towing vehicle, an element adapted to be axially connected to said first-mentioned element, means for locking said elements together, a frame for said towed vehicle, a generally triangular plate connectable to said frame, a pin adapted to pass through one end of said second-mentioned element and through said plate, said second-mentioned element being rotatable on said pin with respect to said plate, resilient means on said pin for resiliently connecting said plate to said second-mentioned element, said plate having a recess therein in which said end of said second-mentioned element is positioned during straightaway travel of said vehicles, and means adapted to connect said plate to said frame.

9. A coupling device in accordance with claim 8 in which the sides of said plate having said recess therein increase in thickness starting at said recess, said second-mentioned element contacting one of said sides depending on the direction of turn of said vehicles, the tension in said resilient means increasing as said second-mentioned means moves away from said recess with the turning action.

10. A coupling device in accordance with claim 8 in which said last-mentioned means includes a ball attached to said plate and a socket attached to said frame.

11. A coupling device in accordance with claim 10 in which said last-mentioned means includes a pair of spring bars attached to said plate and said frame.

12. A device adapted to couple a towing vehicle to a towed vehicle comprising an element fixed to and extending from said towing vehicle, a plate fixedly connected to and extending from said towed vehicle, said plate having an elongated recess therein substantially parallel with the axis of said towed vehicle, said element having a portion thereof in said recess during straightaway travel of said vehicles, the axis of said element being substantially parallel to the axis of said towing vehicle, said plate also having arcuate cam portions increasing in thickness starting at the sides of the end of said recess in the portion of said plate nearest said towing vehicle, and means attached to said element positioned adjacent the other end of said recess and passing through an opening in said plate for rotatably connecting said plate to said element.

13. A device in accordance with claim 12 in which said means for rotatably connecting said plate to said element includes a rod passing through said opening in said plate, a spring around said rod above said plate and means for adjusting the tension of said spring.

14. A device in accordance with claim 12 in which a ball on said plate and a socket on said towed vehicle are provided for connecting said plate to said towed vehicle.

References Cited in the file of this patent

UNITED STATES PATENTS

| | | |
|---|---|---|
| 2,131,068 | Payne | Sept. 27, 1938 |
| 2,133,065 | Weber | Oct. 11, 1938 |
| 2,793,879 | Bair | May 28, 1957 |